United States Patent

[11] 3,575,448

| | | |
|---|---|---|
| [72] | Inventor | Vincent Licari<br>St. Joseph, Mich. |
| [21] | Appl. No. | 832,793 |
| [22] | Filed | June 12, 1969 |
| [45] | Patented | Apr. 20, 1971 |
| [73] | Assignee | Clark Equipment Company |

[54] FASTENER
3 Claims, 3 Drawing Figs.

[52] U.S. Cl. .................................................. 287/189.36B, 29/475
[51] Int. Cl. .................................................. G16b 4/00
[50] Field of Search ....................................... 287/189.36 (B); 29/(Inquired)

[56] References Cited
UNITED STATES PATENTS

| | | | |
|---|---|---|---|
| 2,191,632 | 2/1940 | Smith | 287/189.36BUX |
| 2,193,146 | 3/1940 | Skeel et al. | 287/189.36BX |
| 2,236,186 | 3/1941 | Murray | 287/189.36BX |
| 2,860,230 | 11/1958 | Rapasky | 287/189.36BX |

*Primary Examiner*—David J. Williamowsky
*Assistant Examiner*—Wayne L. Shedd
*Attorneys*—Kenneth C. Witt, John C. Wiessler, Robert H. Johnson and Reginald J. Falkowski

ABSTRACT: A fastener consisting of two members secured together by welding, with a third member securely clamped between the two members by the shrinkage of the weld as it cools.

Patented April 20, 1971

3,575,448

INVENTOR
VINCENT LICARI

BY Kenneth C. Witt
ATTORNEY 3,575,448

FASTENER

BACKGROUND OF THE INVENTION

This invention relates to fasteners, and is particularly useful in situations in which the fasteners must have great strength and are utilized under adverse conditions. However, it will be appreciated by those skilled in the art that it may be utilized in other environments and in other ways than the preferred mode described and illustrated herein.

Rivets, nuts and bolts, clamps and a variety of other fasteners are known and used. Some of these have heretofore been used in the particular environment in which the present invention is shown herein. However, the present invention is simpler and better as well as being more rugged and reliable in many applications than other fasteners known heretofore.

SUMMARY OF THE INVENTION

A fastener construction comprising two members secured together by welding and a third member securely clamped between the two members by the shrinkage of the weld as it cools.

BRIEF DESCRIPTION OF THE DRAWING

In the drawing, which shows the best mode contemplated for carrying out the invention.

DESCRIPTION OF THE PREFERRED EMBODIMENT

Figure 3:
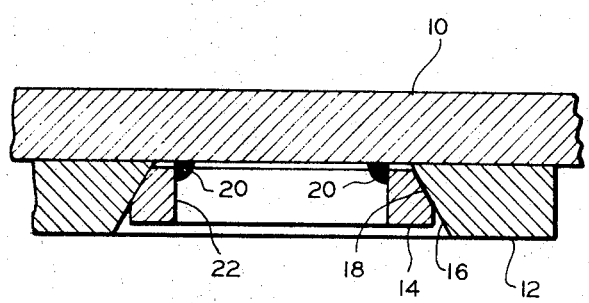
FIG. 3 shows a fragmentary sectional view along the lines 3–3 of FIG. 2.

Referring first to FIG. 3 of the drawing, there is shown an enlarged view of a fastener construction embodying the present invention. The numeral 10 indicates a flat plate member of weldable material to which is firmly secured another piece of material 12 which may be, for example, material which is difficult to weld or even completely unweldable. The member 12 is securely fastened to member 10 by means of a locking ring 14 in the manner explained hereinafter.

The member 12 has a surface 16 which is shown in this preferred embodiment as a frustoconical tapered surface in an opening in member 12. Member 14 has an exterior frustoconical surface 18 which mates with surface 16. While surfaces 16 and 18 are of circular configuration in this preferred embodiment, it will be appreciated that such configuration is not essential to the present invention.

Member 12 is securely fastened to member 10 and held in close contact therewith by means of a weld 20 which, as shown, connects ring 14 to member 10. The weld may be a complete circle, if necessary, in order to provide the desired strength or it may occupy only certain intervals around the circle formed by the opening 22 in member 14 if less strength is desired.

As used herein, welding is deemed to mean also brazing or any other equivalent means of uniting metallic parts by melting the surfaces of the parts to be joined and then allowing the melted parts to flow together either with or without the addition of metal to the weld during the welding operation. The welding can be done by the electric arc process, oxygen-acetylene process or other known welding process.

It is known that most welds shrink as they cool, and it is this characteristic which is utilized in the present invention in order to provide a secure connection of one member to another. As the weld 20 cools, it pulls member 12 tightly against member 10 because of the wedging action of surface 18 on surface 16.

Figure 1:
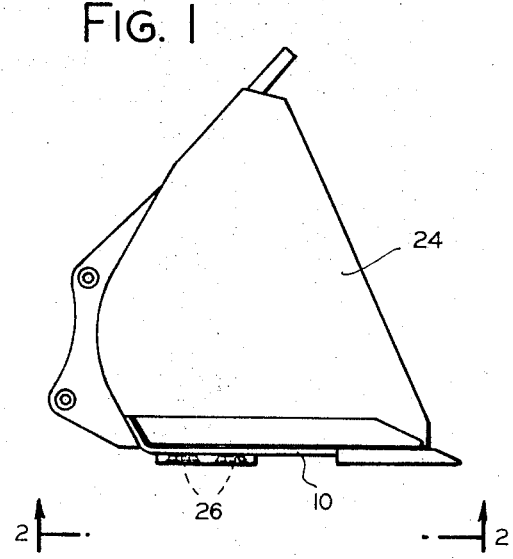
FIG. 1 shows a side elevational view of a loader bucket with wear plates secured on the bottom surface thereof by means of the fastener construction of the present invention.
Figure 2:
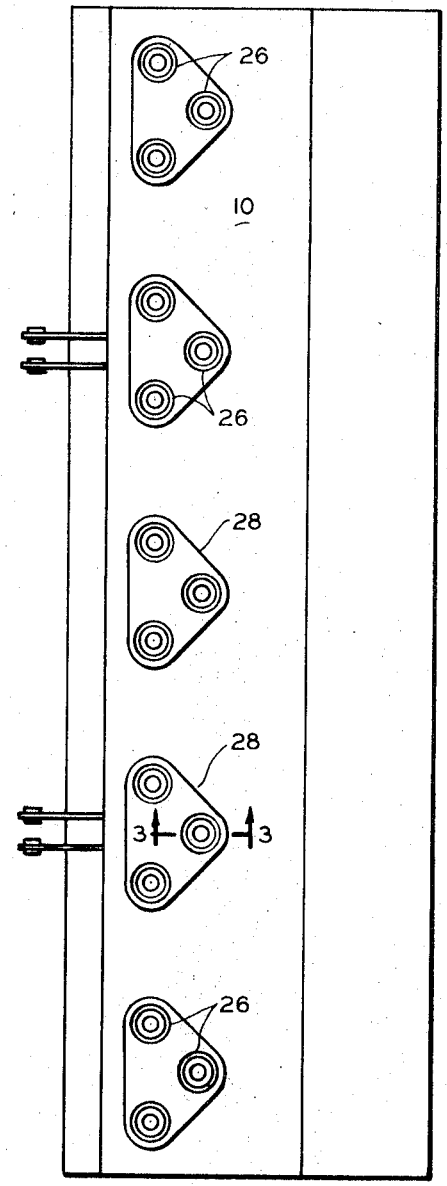
FIG. 2 shows a bottom view of the bucket of FIG. 1 along the lines 2–2 of FIG. 1.

FIGS. 1 and 2 show a typical application of the present invention in which the fastener construction of this invention is utilized to secure wear plates on the bottom of a loader bucket. FIG. 1 shows an end elevation view of such a bucket, which is indicated by the numeral 24. The bottom of the bucket is indicated by the numeral 10 to correspond with member 10 in FIG. 3, while the fastener construction of the present invention is indicated generally in these FIGS. by the numeral 26.

As shown in FIG. 3, there are five wear plates 28 secured to the bottom of the bucket in this particular case, although it will be appreciated that any desired number may be utilized. Also, it will be readily understood that while there are three fasteners per wear plate shown in this typical illustration, in which the wear plates have a generally isosceles triangle shape with rounded corners that it is possible to utilize any necessary quantity of the fastener constructions of this invention in order to adequately secure the wear plates to the bottom of the bucket.

The wear plates 28 are located at what is called the heel of the loader bucket. As the bucket is being utilized for loading dirt, rocks or other material, the heel of the bucket is continually in engagement with such material and moreover it is used as the pry point when the bucket is tilted back to get a load of material in the bucket. Consequently, in the case of abrasive material particularly, the heel of the bucket is subject to considerable wear. The present invention makes it possible to secure to the heel of the bucket wear plates of tool steel or other abrasive resistant material without the necessity of making any holes in the bottom of the bucket, such as would be required for nuts and bolts or rivets, for example. Moreover, the fastener construction does not include anything which projects down below the level of the wear plates to provide interference with operation of the bucket. Still further, the wear plate can be readily replaced by cutting the welds on the rings holding the wear plates on the bucket and then rewelding the same or other rings onto the bottom of the bucket after the wear plates have been replaced.

While I have illustrated and described herein a preferred embodiment of my invention, it will be appreciated that modifications may be made by those skilled in the art, and I intend to cover by the appended claims all such modifications falling within the true spirit and scope of my invention.

I claim:

1. A fastener construction for firmly securing a first member to a second weldable member comprising a surface on the first member located so that force exerted on said surface has a component urging the said first member into engagement with the second member, a third member having a portion thereon in engagement with the said surface on the first member, the said third member having another portion thereof adjacent to but spaced from the second member, and a weld joining the second and third members and clamping the first member therebetween by the shrinkage of the weld as it cools.

2. A fastener construction as specified in claim 1 in which the first member has a circular opening therein and the said surface on the said first member surrounds such opening and is circular with a frustoconical surface, and the said third member is located in the said opening and is also circular, and the portion thereon which engages the first member is a mating external frustoconical surface in engagement with the said first frustoconical surface.

3. The method of firmly securing together two members, one of which is weldable, which comprises providing a surface on the member other than the weldable member which is engaged by a third member to urge it against the weldable member, placing a third weldable member in engagement with the said surface in a position leaving a space between the said third member and the weldable member, and welding the said third member and the weldable member and thereby securing the said other member to the weldable member by the shrinkage of the weld as it cools exerting a clamping force on the said other member between the said third member and the weldable member.

Dedication 3,575,448.—*Vincent Licari*, St. Joseph, Mich. FASTENER. Patent dated Apr. 20, 1971. Dedication filed Oct. 27, 1972, by the assignee, *Clark Equipment Company*.

Hereby dedicates to the Public the entire term of said patent.

[*Official Gazette March 13, 1973.*]